(No Model.) 2 Sheets—Sheet 1.

A. PUNTENEY & E. C. SOOY.
CORN PLANTER.

No. 542,351. Patented July 9, 1895.

Witnesses
C. E. Livers.
S. L. C. Hasson.

Inventors
Archibald Punteney
Ephraim C. Sooy.
By Rich'd K. Manning Att.

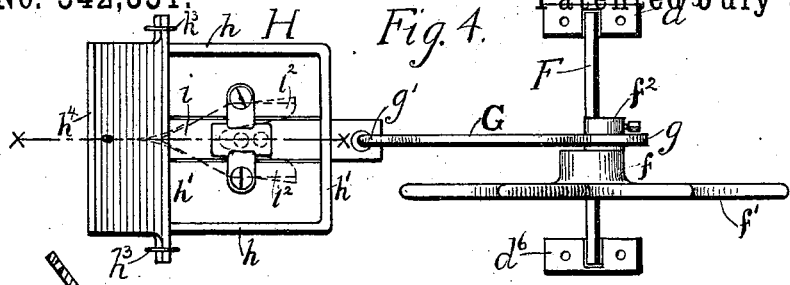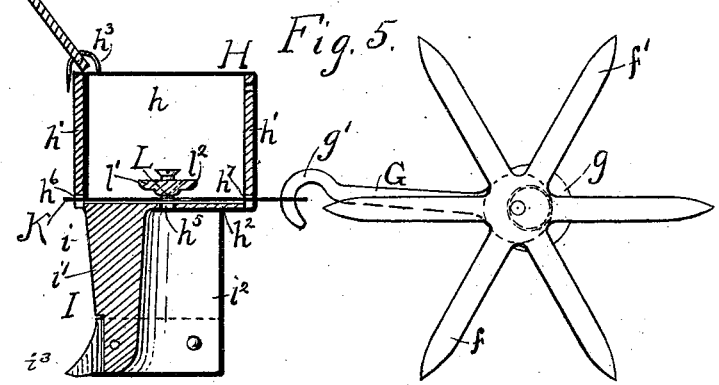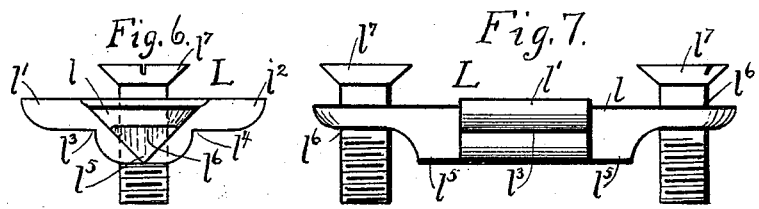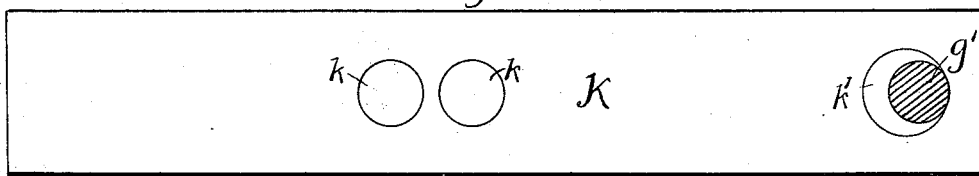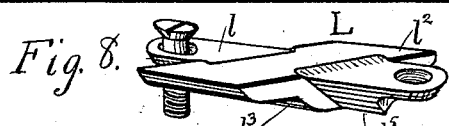

UNITED STATES PATENT OFFICE.

ARCHIEBALD PUNTENEY AND EPHRAIM C. SOOY, OF KANSAS CITY, MISSOURI, ASSIGNORS TO THE KANSAS CITY HAY PRESS COMPANY, OF SAME PLACE.

CORN-PLANTER.

SPECIFICATION forming part of Letters Patent No. 542,351, dated July 9, 1895.

Application filed December 8, 1892. Serial No. 454,311. (No model.)

*To all whom it may concern:*

Be it known that we, ARCHIEBALD PUNTENEY and EPHRAIM C. SOOY, citizens of the United States, residing at Kansas City, in the county of Jackson and State of Missouri, have invented certain new and useful Improvements in Corn-Planters; and we do hereby declare that the following is a full, clear, and exact description of the invention, such as will enable others to make and use the same, reference being had to the accompanying drawings, forming a part of this specification.

Our invention consists in the novel construction and combination of parts, such as will first be fully described, and specifically pointed out in the claim.

Figure 1:
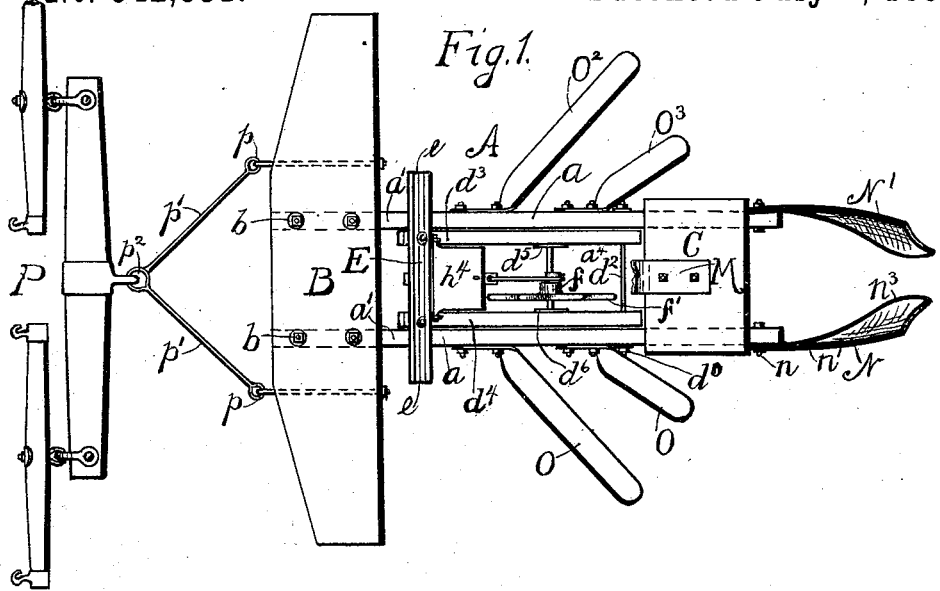
Figure 2:
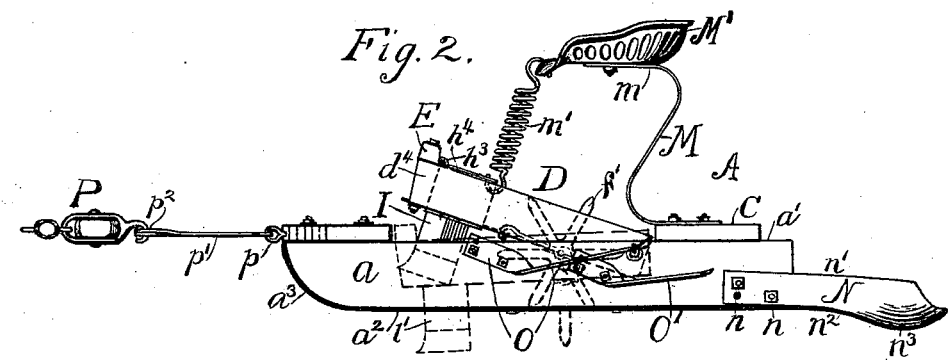
Figure 3:
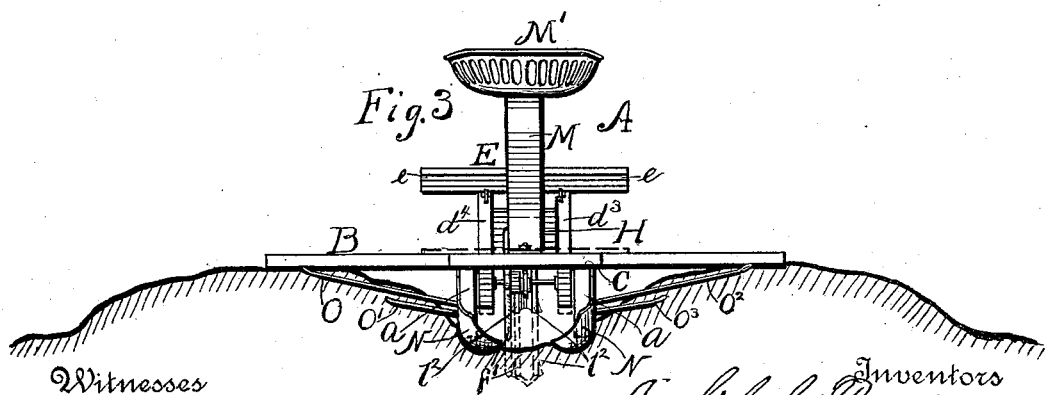

In the drawings, Figure 1 is a plan view of the planting-machine, showing the improvements. Fig. 2 is a side elevation of the machine. Fig. 3 is a rear end view of the planter shown within the trench and the soil-conveyers on each side and the seed course at the end of the planter. Fig. 4 is a plan view showing in detail the seed-hopper with the cover turned back, showing the reciprocating slide, and also showing the spoke-wheel and shaft and the eccentric and arm for operating the slide. Fig. 5 is a vertical sectional view of the seed-hopper and planter-shoe, taken upon the line $x$ $x$ of Fig. 4, also showing a side view of the spoked wheel and the arm upon the eccentric. Fig. 6 is an end view of the seed-agitator in the hopper. Fig. 7 is a side view of the seed-agitator. Fig. 8 is a perspective view of the seed-agitator. Fig. 9 is a plan view of the reciprocating slide, showing the openings for the seed and eccentric-arm.

Similar letters of reference indicate corresponding parts in all the figures.

In the construction of our improved planter we first make a sliding carrier A, which is constructed as follows: The sides of the carrier A are composed of vertical runners $a$ $a$, arranged in a parallel position at a considerable distance apart and provided with horizontal upper and lower edges $a'$ $a^2$. At the forward end of the runner $a$ the lower horizontal edge $a^2$ is curved or inclined at $a^3$ in the direction of the upper edge $a'$, so as to avoid obstructions. The forward end of the other runner $a$ is curved in like manner.

To the forward ends of the runners $a$ $a$ is secured by the bolts $b$ $b$ a transverse beam B, which extends from the upper edge of one runner $a$ to the upper edge of the other runner and an equal distance from the outer side of each runner.

To the rear ends of the runners $a$ $a$ is secured rigidly a transverse platform C, which extends from the upper edge $a'$ of the runner $a$ to the upper edge of the other runner. The rear edge of platform C extends to within a short distance of the extreme rear ends of the said runners, and toward the forward ends of said runners the platform C extends a short distance for the support of the standard hereinafter described.

Between the forward edge of the platform C and the rear edge of the beam B and the inner sides of the runners $a$ $a$ in the opening $a^4$ is arranged the planter-frame D, which is constructed as follows: Through the side of one of the runners $a$, near the upper edge $a'$ of said runner and a short distance in advance of the line of the forward edge of the platform C, is inserted one end of a rod $d^2$, which extends across the opening $a^4$ and through the side of the other runner $a$, and is provided with securing-nuts at each end. To the rod $d^2$, on the inner side of one runner $a$, is pivoted or hinged one end of a bar $d^3$, the other end of which bar extends to within a short distance of the line of the rear edge of beam B. A similar bar $d^4$ is pivoted at one end to rod $d^2$ on the inner side of the other runner $a$, which is of the same length as the bar $d^3$.

To the upper edge of one bar $d^3$ and at the forward vibrating end of said bar is rigidly attached a transverse foot-rest or plate E, which extends to and is also attached rigidly to the upper edge and forward end of the bar $d^4$. The ends $e$ $e$ of the plate E extend in a transverse direction to and over the upper edge of the respective runners $a$ $a$ and a short distance beyond the outer side of said runners.

To the inner side of the vibrating bar $d^3$, at a point in the direction of bar E nearly one-third of the length of said bar described from the pivotal point on rod $d^2$, is attached a journal-box $d^5$. Upon the under side of the bar $d^4$, at a similar described point, is attached a journal-box $d^6$, (see Figs. 1 and 3,) in which are journaled the respective ends of a rotary shaft F. On shaft F is mounted rigidly a hub $f$. To the hub $f$ are attached the spokes $f'$ $f'$, which extend radially from said hub a suitable distance to enter the soil.

Upon one side of hub $f$, and rigidly connected therewith, is an eccentric $f^2$. Around the eccentric $f^2$ is extended a circular ring or plate $g$, to which is attached one end of an arm G, the other end of which arm extends in the direction of the beam B the required distance, and upon said end is a hook $g'$. Between the bars $d^3$ $d^4$ of the planter-frame D, close in position to the rear edge of the plate E, is arranged the seed-hopper H. Said hopper consists of a box, which is square in form and is made with the vertical sides $h$ $h$ $h'$ $h'$, which extend from the line of the upper edge of the bars $d^3$ $d^4$ downwardly in line with the lower edge of said bars, and the sides $h$ $h$ extend rearwardly from the rear edge of the plate E a short distance in the direction of the platform C.

The sides $h$ $h$ of the hopper H are rigidly attached to the inner side of the said bars $d^3$ $d^4$, and upon the lower edge of said sides is attached a bottom $h^2$. On the upper edges of the respective bars $d^3$ $d^4$, near the rear edge of the plate E, are secured the staples $h^3$ $h^3$. A cover $h^4$ is made for the hopper H, which is hinged at one end to the staples $h^3$ $h^3$.

To the under side portion of the bottom $h^2$ of the hopper H, at a point equidistant from the sides $h$ $h$, is attached rigidly the upper end of a furrow-dividing shoe I. Said shoe is composed of a triangular-shaped bar $i$, which extends from the under side of the bottom $h^2$ nearly in line with the forward side $h'$ of the bar H and in a downward direction a considerable distance, one edge portion $i'$ of which bar is directed forward so as to divide the soil. To the respective sides of the bar $i$ are attached rigidly the rearwardly-extended side plates or flanges $i^2$ $i^2$, which extend also in a downward direction in line with the lower end of bar $i'$ and outwardly in line with the angle described by said sides.

To the lower end and front edge of the bar I is attached a plow-point $i^3$, the forward edge of which is curved upwardly toward the edge $i'$ of said bar $i$. In the bottom $h^2$ of the hopper H, at a point equidistant from the sides $h$ $h$ and $h'$ $h'$, is a perforation $h^5$ for the corn to drop through. In the front side $h'$ of the hopper H, equidistant from the sides $h$ $h$ and nearly in line with the upper side of bottom $h^2$, is a slot $h^6$. In the rear side $h'$ of the hopper H, in direct line with the slot $h^6$, is a slot $h^7$. In the hopper H, and extending through the respective slots $h^6$ $h^7$, is inserted a reciprocating flat plate K. In plate K, on both sides of a line drawn through the perforations $h^5$ in the bottom $h^2$ of the hopper, are the perforations $k$ $k$, which are nearly of the same size as the perforation $h^5$, and register alternately therewith. One end of plate K extends outside of hopper H toward the arm G of the eccentric $f^2$, and is perforated at $k'$, in which is inserted the hook $g'$ of said arm G. In the bottom of hopper H, in a transverse direction to and resting upon plate K, in line transversely with the perforation $h^5$, is the seed-cut-off plate L. Said plate L consists of a narrow flat bar $l$ extending across the plates K. Extending laterally from one side of the bar $l$ a short distance and over the plate K is a wing $l'$, which is nearly of the same width as said plate K. Upon the other side of the bar $l$ is extended a wing $l^2$, which is similar to the wing $l'$. In the longitudinal direction of the bar $l$, and in the outer edge and under side of the wing $l'$, is a rabbet $l^3$, which extends nearly to the line of the bar $l$.

In the under side and outer edge of the wing $l^2$ is a rabbet $l^4$, which is similar to the rabbet $l^3$. The ends of the bar $l$, extending beyond the line of the sides of the plate K, are each inclined inwardly and downwardly, terminating in a single edge $l^5$. In each end of bar $l$ is a vertical perforation $l^6$. Through each perforation $l^6$ $l^6$ is inserted a screw $l^7$, which are smaller diametrically than the opening $l^6$, and of a considerable length, and penetrate the bottom $h^2$ of the hopper H a sufficient distance to retain said screws in position. The shanks of the screws are comparatively long and the heads of said screws prevent the plate L from removal.

Upon the platform C of the planter is attached the lower end of a standard M, the upper end $m$ of which is extended forward in the direction in which the planter is propelled and in a horizontal position over the planter-frame D. Upon said end is attached fixedly a seat M'. To the forward end of the seat M' is attached one end of the wire of a coiled spring $m'$, the other end of which wire of said spring is attached to the rear side $a'$ and near the upper edge of the hopper H, so that the planter-frame is ordinarily in the position as seen in Fig. 2.

To the outer side and at the rear end of one of the runners $a$, in line with the lower edge $a^2$, is attached by the bolts $n$ $n$ a seed-covering plate N, which extends rearwardly from said runners the requisite distance. The upper edge $n'$ of the plate N extends nearly in a straight line to the rear end of said plate. The lower edge $n^2$ of said plate extends for a short distance parallel with the upper edge $n'$, and at the extreme rear end of said plate describes a downwardly-curved line, as at $n^3$. The lower edge at the rear curved end $n^3$ of the plate N is bent upwardly and inwardly in the direction of a line drawn equidistant from the runners $a$ $a$ in the longitudinal direction of the planter and made concave.

Upon the other side of the planter and attached to the rear end of the other runner $a$ is a plate N', which is constructed in precisely the same manner as the plate N, the extreme rear concave end of which is turned inwardly toward the concave end of the plate N. To the outer side of the runner $a$, at a point equidistant from the front and rear ends of said runner and near the upper edge $a'$, is attached rigidly one end $o$ of a hill-leveling or soil scraper O. Said scraper consists of a narrow plate or blade of suitable thickness, which extends downwardly and rearwardly on the side of runner $a$ at a slight angle of inclination, and the other end extends outwardly and rearwardly and the lower edge is turned in an upward forward direction, the upper side of said plate being inclined downwardly at a slight angle of inclination from the horizontal line of the planter. The said scraper O extends so far in length as to scrape the soil the width between furrows or trenches. In rear of the scraper O and attached to the same side of the runner $a$ and at a point a short distance below the line of the upper edge $a'$ is attached a scraper O', which is shorter in length than scraper O, and is constructed and arranged in position in the same manner as the scraper O.

Upon the other side of the planter and attached to the other runner $a$ are the scrapers $O^2 O^3$, which are arranged in the same position and extend outwardly from the outer side of the runner in precisely the same manner as the scrapers O O'. Upon the front edge of the beam B of the planter are the eye-bolts $p$ $p$, in which are hooked the ends of the rods $p'$ $p'$. The outer ends of the rods $p'$ $p'$ are connected with a single ring $p^3$, to which ring is attached the draft-equalizers P, to which the horses are attached for the propulsion of the planter.

The operation of the planter is as follows: The field in which the planter is effectively employed is first plowed with a listing-plow, so as to form parallel trenches in which the corn is planted. The plow thus forms intermediate furrows on both sides of the trench, in one of which trenches the planter is arranged in position and started with the applied power. The scrapers O O' first enter beneath the surface of the soil in the furrows, which falls in the direction of the rear end of the planter-runners for the available covering of the corn. The hopper H is supplied with seed-corn, and as soon as the operator upon the seat M' observes an unplanted portion of the trench the forward vibrating end of the planter-frame D is depressed by the foot of the operator, which action causes the said furrowing-shoe I to enter the ground below the line of the bottom of the trench, and also throws the spokes $f'$ in the hub $g$ into the soil and rotation is imparted to shaft F, and the reciprocating slide receives and drops the corn between plates $i^2$ $i^2$ of the shoe I in the proper quantity. In attempting to enter the openings $k$ $k$ in the plate K during the forward and backward movement of said plate the corn endeavors to crowd beneath one or the other wing, which are permitted an oscillating movement on the single edge $l^5$ of the ends of the bar L. In the movement of the plate K in one direction the plate $l$ is oscillated in the other direction and its weight distributes the corn in the rabbet beneath the depressed wing and lays the corn upon its side in readiness for the reverse movement of the plate F, in which movement the other wing is depressed to resist the pressure of the corn. When the action of the reciprocating plate K is rapid, the plate L rises a sufficient distance to prevent the check upon the movement of said plate or the crushing of the corn. As soon as the corn is dropped, the soil, which is loosened by the scrapers O O', falls in the path of the concave plates N N', and the corn is covered with the loose soil, the concave plates gathering the soil and forming ridges as the planter advances and passes the replanted ground. As soon as the pressure is released from the planter-frame it rebounds in the position first described.

Instead of actuating the planter-frame with the foot this movement may be accomplished with a lever in substantially the same manner.

Having fully described our invention, what we now claim as new, and desire to secure by Letters Patent, is—

In a planting machine the combination with the sides of said machine of an intermediate vibrating frame hinged at its rear end to the rear end of the said sides and having a hopper for the seed upon its forward vibrating end and openings for the seed and seed feeding devices in said hopper, a spoked wheel mounted upon a rotating shaft upon said vibrating frame in rear of said hopper and an eccentric on said shaft an eccentric arm connected with the said seed dropping devices in said hopper and a support upon said planting machine extending above said frame and a spring connected with the upper end of said support and the vibrating end of said frame whereby the automatic action of the spoked wheel is enabled to be made constant in the path of the furrow made by the plow.

ARCHIEBALD PUNTENEY.
EPHRAIM C. SOOY.

Witnesses:
W. A. SIMMONS,
S. L. C. HASSON.